(12) United States Patent
Morgan (10) Patent No.: US 7,778,448 B2
(45) Date of Patent: Aug. 17, 2010

(54) METHOD AND SYSTEM FOR ON-LINE CERTIFICATE OF AUTHENTICITY FOR COLLECTIBLES AND ON-LINE SIGNATURE VERIFICATION OF COLLECTIBLES

(75) Inventor: Dan C. Morgan, San Jose, CA (US)

(73) Assignee: AuthenticSig, Inc., San Jose, CA (US)

( * ) Notice: Subject to any disclaimer, the term of this patent is extended or adjusted under 35 U.S.C. 154(b) by 1102 days.

(21) Appl. No.: 11/390,701

(22) Filed: Mar. 27, 2006

(65) Prior Publication Data

US 2006/0239516 A1  Oct. 26, 2006

Related U.S. Application Data (63) Continuation-in-part of application No. 09/733,794, filed on Dec. 7, 2000, now abandoned, and a continuation-in-part of application No. 09/804,953, filed on Mar. 13, 2001, now abandoned.

(51) Int. Cl.
*G06K 9/00* (2006.01)
(52) U.S. Cl. ............................ 382/119; 713/186; 902/3; 340/5.53; 340/5.83
(58) Field of Classification Search ......... 382/119–123; 73/865.4; 178/18.01; 348/161; 340/5.1, 340/5.2, 5.52, 5.53, 5.8–5.86; 356/71; 902/3; 713/186
See application file for complete search history.

(56) References Cited

U.S. PATENT DOCUMENTS

| | | | |
|---|---|---|---|
| 5,267,756 A | 12/1993 | Molee et al. | |
| 5,432,329 A | 7/1995 | Colgate, Jr. et al. | |
| 5,673,338 A | 9/1997 | Denenberg et al. | |
| 6,250,549 B1 | 6/2001 | DeFabio, Jr. | |
| 6,309,690 B1 | 10/2001 | Brogger et al. | |
| 6,311,042 B1 * | 10/2001 | DeSchrijver | 455/66.1 |
| 6,424,728 B1 * | 7/2002 | Ammar | 382/119 |
| 6,475,634 B1 | 11/2002 | Lam | |
| 6,591,252 B1 | 7/2003 | Young | |
| 2001/0033676 A1 | 10/2001 | Noyes | |
| 2001/0049606 A1 | 12/2001 | Lucarelli | |
| 2003/0220885 A1 | 11/2003 | Lucarelli et al. | |

* cited by examiner

*Primary Examiner*—Aaron W Carter
(74) *Attorney, Agent, or Firm*—Quine Intellectual Property Law Group; Stephen J. LeBlanc (57) ABSTRACT

An on-line method for issuing a certificate of authenticity for a collectible to a collector who has personally witnessed the collectible being signed and a verification system for authenticating a suspected signature on an object by scanning the suspected signature and transmitting to a central computer where the suspected signature is compared with a set of authentic reference signatures based on input as to the shape of the object. In embodiments, the collector provides information on the collectible via the Internet to a central computer which stores the information for future reference by potential purchasers of the collectible. The collector must sign a statement on the certificate of authenticity that declares, under penalty of perjury, the information that the collector provided regarding the collectible is correct. Subsequent purchasers can access the central computer via the Internet.

12 Claims, 5 Drawing Sheets

METHOD AND SYSTEM FOR ON-LINE CERTIFICATE OF AUTHENTICITY FOR COLLECTIBLES AND ON-LINE SIGNATURE VERIFICATION OF COLLECTIBLES

CROSS REFERENCE TO RELATED APPLICATIONS

This application is a continuation in part of patent application Ser. No. 09/733,794 filed on Dec. 7, 2000 for the invention entitled "On Line Signature Verification of Collectibles."

This application is a continuation in part also of patent application Ser. No. 09/804,953 filed on Mar. 13, 2001 for the invention entitled "On Line On-line certificate of authenticity for collectibles."

The above referenced documents and application and all documents referenced therein are incorporated in by reference for all purposes.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to a method employing an on-line computer system for issuing certificates of authenticity for a collectible object where the collector personally witnessed a celebrity, artist, or athlete signing the collectible.

The present invention also relates to a method employing an on-line computer system for verifying or authenticating signatures of celebrities, artists, or athletes that have been scribed onto flat or irregularly shaped collectible objects.

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

PART 1

Description of the Related Art

One of the problems faced by purchasers of collectibles that are inscribed with a signature of a celebrity, artist, or athlete is trying to determine whether the signature is authentic or forged. Until now there has not been a way for a purchaser to be able to have the signature authenticated quickly and accurately prior to purchasing the collectible. Currently consumers must first purchase a collectible item, deliver the item to a forensic signature specialist, and wait for a response. Such verification practice takes unnecessary time and can cost more than the collectible is worth. Also this practice involves risks associated with shipping. And verification by a forensic signature specialist is subject to human subjectiveness. Because the current practice of signature verification of signed collectibles is typically performed after purchase, if the signature is a forgery, the collector is left with a worthless item, causing legal battles and disappointment for the purchaser. Because dealers of signed collectibles are required by law to issue certificates of authenticity but are not required to obtain signature verification before the sale, the certificates of authenticity are often worthless.

Signature verification is available to financial institutions, but currently the signed collectible industry does not have similar verification methods available for its use. Also, current automatic signature verification is limited to two dimensional or flat items. No automatic signature verification provisions have been made for curved surfaces such as footballs, baseballs, or basketballs. Because there is not a convenient and automatic signature verification process for the collectible industry, this results in millions of dollar wasted annually on forged collectibles The present invention is a verification system that allows a purchaser to scan the suspected signature into a personal computer, a portable computer, or a palm computer via either a desk top scanner, a hand held scanner, or a digital camera and to transmit the scanned suspected signature via the Internet to a central computer that is capable of comparing the suspected signature with authentic reference signatures and providing the purchaser with an immediate indication whether the suspected signature is authentic or not authentic. If the purchaser wants proof of verification, he may request a certificate of authenticity having a serialized hologram that is identical to a serialized hologram that is then permanently affixed to the collectible.

SUMMARY OF THE INVENTION

The present invention is a verification system for authenticating a signature on a collectible quickly without having to transport the collectible. The suspected signature is scanned into an originating computer, i.e. either a personal computer, a portable computer, or a palm computer. A desk top scanner that is connected to the originating computer can be used for scanning flat collectibles such as photographs, or a hand held scanner that is connected to the originating computer can be used for scanning either flat objects or irregular shaped objects such as baseballs, footballs, basketballs, etc. Alternately, a digital camera may be used to scan the collectible with the image being entered into the originating computer from the camera. Then the suspected signature is electronically transmitted via the Internet to a central computer that is provided with software that compares the suspected signature with authentic reference signatures stored in the central computer. The central computer then immediately transmits to the originating computer an authentication of the signature or an indication that the suspected signature can not be authenticated.

If the purchaser wants proof of verification, he may request a certificate of authenticity having a serialized hologram that is identical to a serialized hologram that is then permanently affixed to the collectible.

DETAILED DESCRIPTION OF THE PREFERRED EMBODIMENT

The Invention

Figure 1A:
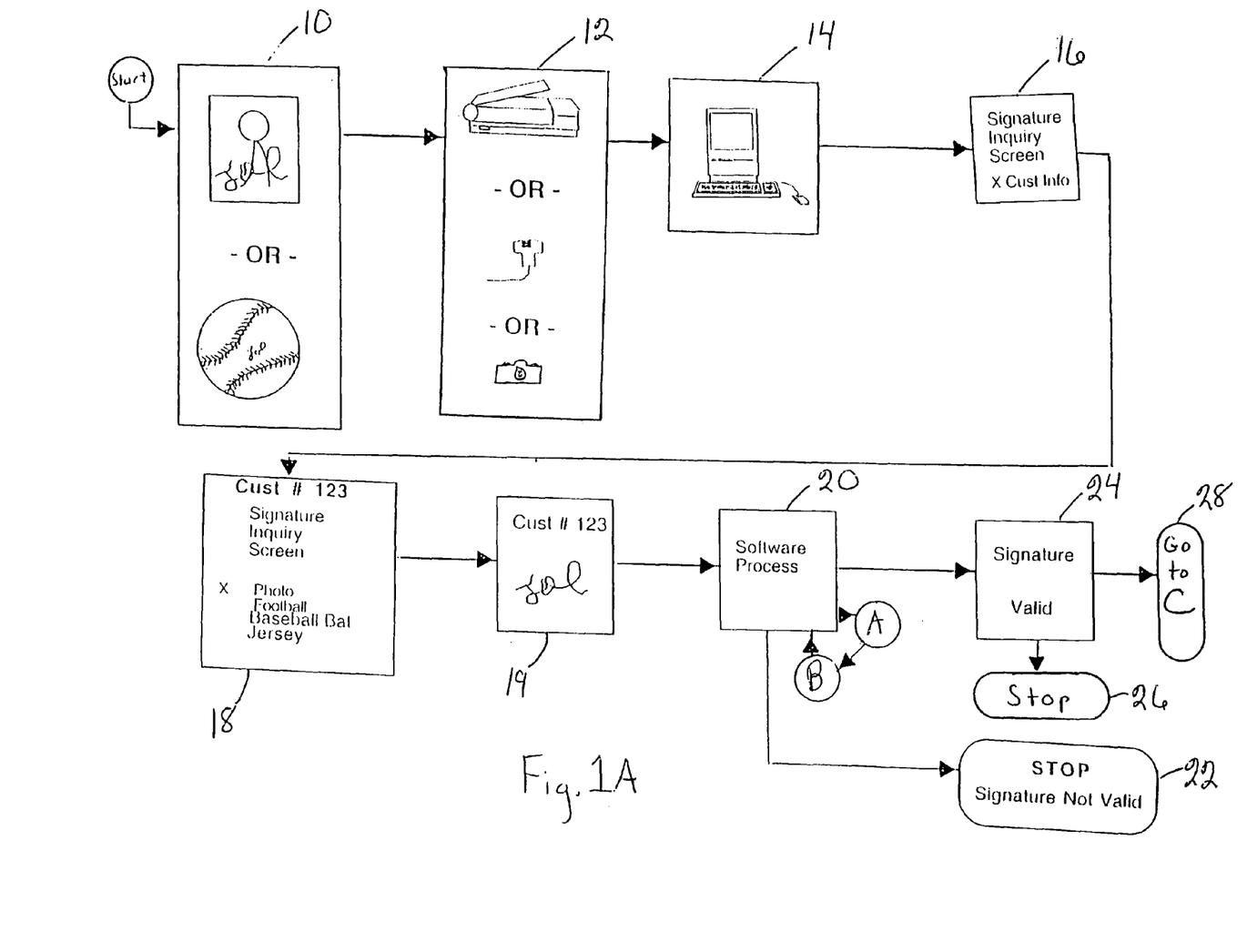
FIGS. 1A, 1B, and 1C are a flow diagram of a method for online signature verification of collectibles according to a preferred embodiment of the present invention.

Referring now to the drawings and initially to FIG. 1A, there is illustrated a method of on-line signature verification of collectibles. As shown in box 10, the collectible may be either a flat object, such as a photograph or painting, or an irregular shaped object, such as a baseball, basketball, or football. The collectible is inscribed with a signature of a celebrity, artist, athlete or other famous person. The signature to be subjected to authentication will hereafter be referred to as the suspected signature.

As shown in boxes 12 and 14, the suspected signature is scanned via a scanner 12 into an originating computer 14, i.e. a personal computer, a portable computer, or a palm computer. The scanner 12 that is used will be a desk top scanner that is connected to the originating computer 14 for scanning flat collectibles, a hand held scanner that is connected to the originating computer for scanning either flat objects or irregular shaped object, or a digital camera from which the image can be entered into the originating computer 14. If the user of this system is an individual, the originating computer 14 and scanner 12 may be the user's personal computer at home or at work. On the other hand, if the user of this system is an agent that has previously contracted to serve as the authorized agent for authenticating collectibles according to this process, the originating computer 14 and scanner 12 will be located in the agent's place of business and the owner of the collectible 10 will bring the collectible to the agent's place of business for authentication.

Next, the user connects via the Internet to a central computer, as represented by the initial signature inquiry screen display of the central computer shown in box 16. The user fills out the requested customer information on the signature inquiry screen of box 16. Then, as shown in box 18, the user must select the type of object that bears the suspected signature that is to be authenticated and the person whose signature is to be authenticated. The computer has a number of reference signatures stored in memory for each signer, i.e. celebrity, artist, athlete, etc. By selecting the type of object that bears the suspected signature and the name of the signer whose signature is to be authenticated, the computer can match the set of reference signatures for the signer that most closely match the configuration of the object, i.e. flat, slightly curved, spherical, etc. This is important to match the configuration of the object to the appropriate set of reference signatures since a signature inscribed on a curved or spherical object with be slightly skewed and these skewed signatures must be compared with equally skewed reference signatures, i.e. reference signatures that are from similarly curved or spherical objects. As illustrated in box 19, the scanned image of the suspected signature is then transmitted from the originating computer 14 to the central computer 16.

Figure 1B:
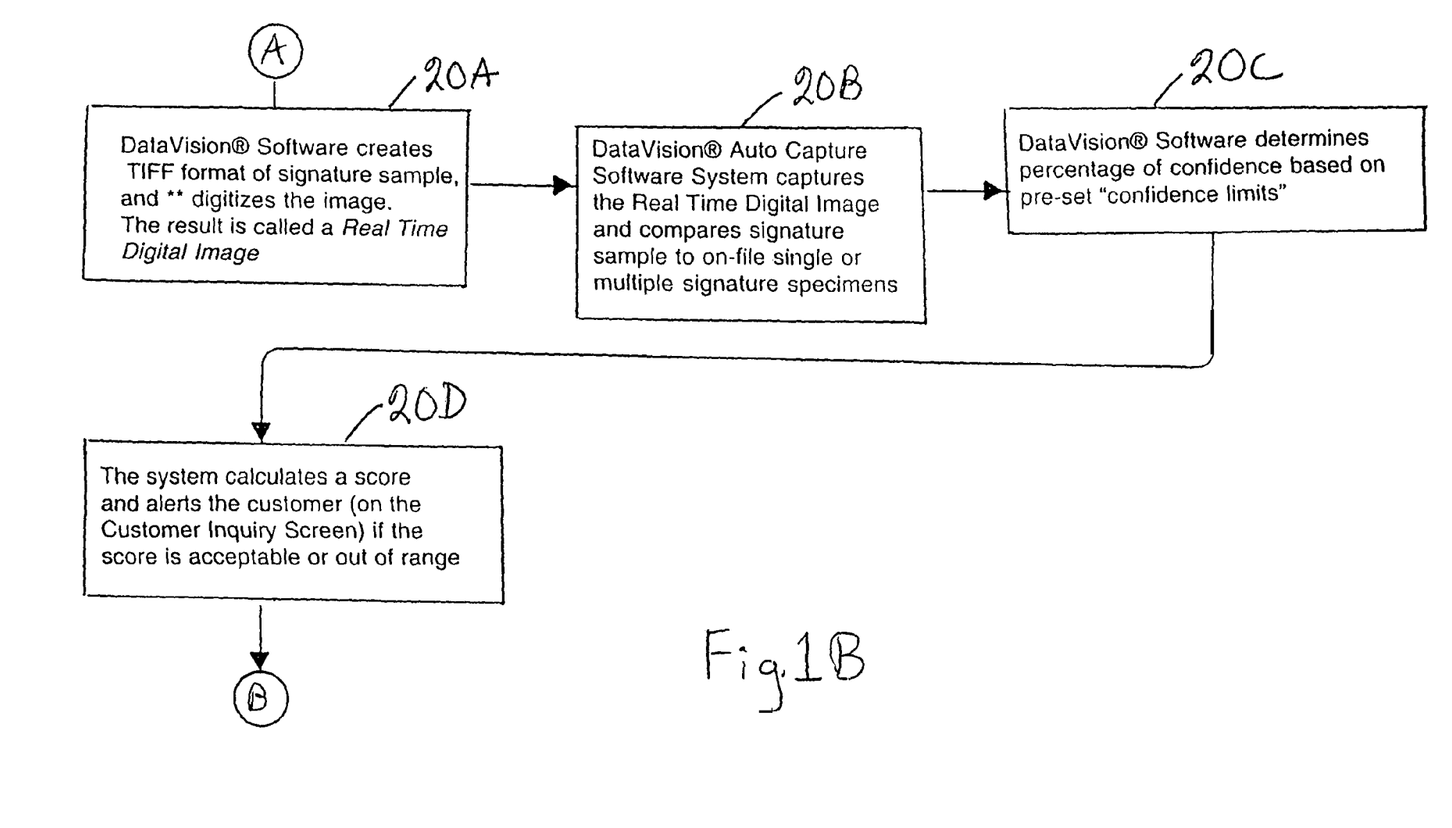

As illustrated in box 20, the central computer 16 is provided with software that compares the suspected signature with the appropriate set of authentic signatures stored in the central computer for the designated individual, i.e. specified celebrity, artist or athlete for which a signature is to be verified. Referring now to FIG. 1B, the details of box 20 are further illustrated, beginning with box A and ending with box B. Box 20A shows that the software employed is DataVision® software. This software is available from Datavision at the following address: 63 County Road, North Falmouth, Mass. 02556. This software can be loaded onto the central computer 16, as illustrated in the drawings, or alternately can reside in an offsite computer that is accessible by the central computer 16 by the Internet or other appropriate real time connection. Although a particular brand of software has been specified, the invention is not so limited. Any suitable software can be use that will accomplish the desired result. Box 20A shows that the software creates a TIFF format of the suspected signature and digitizes the image. This results in what is referred to as a real time digital image. Box 20B shows that the software captures the real time digital image and compares the suspected signature sample to on-file single or multiple signature samples for the same signer. Box 20C shows that the software determines the percentage of confidence based on pre-set confidence limits. For example, the pre-set confidence limit might be set at 95% which means that the suspected signature must match the reference signature or signatures at a confidence level of 95% in order for the suspected signature to be authenticated by the system. As shown in box 20D, the system calculates a score and alerts the user or customer, via the customer inquiry screen, if the score is acceptable or out of range.

Referring now again to FIG. 1A, if the signature is out of range, box 22 shows that the process ends when the suspected signature is found to be invalid. On the other hand, if the suspected signature is valid, as show in box 24, the user may either stop the process, as indicated by box 26, or if the user is an agent for the process, the process can be continued at box C on FIG. 1C, as illustrated by box 28. All of this information is stored in the central computer 16 for retrieval at a future time.

Figure 1C:
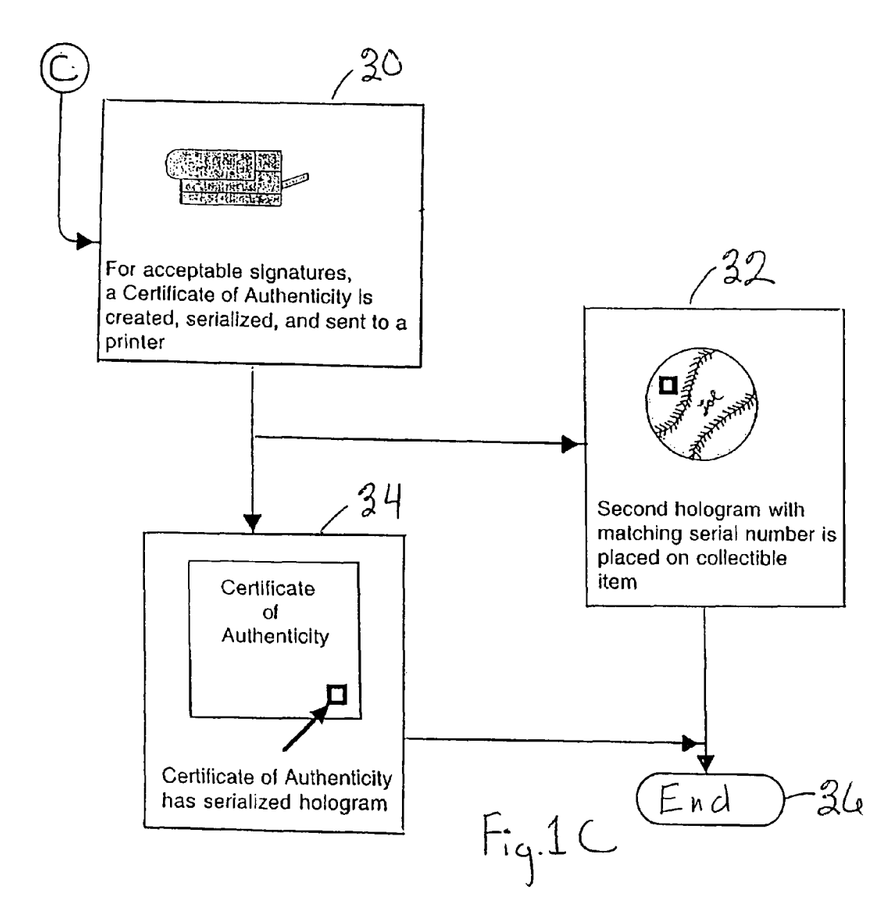

If the user is an agent that has previously contracted to serve as the authorized agent for authenticating collectibles according to this process, the process continues at box C on FIG. 1C. For those signatures that are authenticated, a printer at the user's location, illustrated by box 30, produces a certificate of authenticity bearing a serialized hologram and a second identical serialized hologram for permanently attaching to the object that bears the authentic signature. All of this information is stored in the central computer 16 for retrieval at a future time.

The second hologram is affixed to the collectible to mark the collectible, as illustrated in box 32 and gives the marked collectible 32 and the certificate, as illustrated in box 34, to the owner of the collectible, thus ending the process, as shown by box 36.

Although not illustrated, it may be desirable for security purposes to again require that the marked collectible 32 be scanned again after the second hologram has been affixed to the collectible as a means of verifying that the second hologram has been properly affixed to the collectible.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

PART 2

Description of the Related Art

One of the problems faced by purchasers of collectibles that are inscribed with a signature of a celebrity, artist, or athlete is the lack of availability of standardized, legal certificates of authenticity for the collector who personally witnessed the signature. Until now there has not been a convenient way for the collector who personally witnessed a signature to generate a certificate of authenticity that complies with the legal requirements of every state. Although the law requires a certificate of authenticity be provided at the time of sale of a signed collectible, most collectors do not know that the law exists and do not have access to the necessary certificate of authenticity document. As a result, the collectors are unable to generate legally valid certificates of authenticity. In addition, there has never been an attempt to standardize the certificate of authenticity document, creating much confusion among collectors.

Many signed collectible items that are personally witnessed by the collector are sold without legally valid certificates of authenticity, and in most cases with no certificate at all. This leaves the purchaser with little, if any, guarantee that signature is authentic. The lack of legally valid certificates of authenticity for signed collectibles where a collector personally witnessed the signature is further complicated by the number of times the collectible item is resold. Authenticity of a signed collectible can not be proven and the chain of ownership can not be traced without a certificate of authenticity.

Although most dealers of signed collectibles provide certificates of authenticity upon sale, dealers are unwilling to provide access to certificates of authenticity to collectors due to risks associated with liability of the dealer. Because the current practice of collectors selling signed collectibles where the collector personally witnessed the signature is accomplished without valid legal certificates of authenticity, it is impossible for a purchaser to determine if the signature is authentic or forged. The current practice provides no distinction to the public between the collector who personally witnessed the signature on a collectible they are trying to sell and a person who is attempting to sell a forgery. This practice has created a wary market for signed collectibles. If the signature is a forgery, the purchaser is left with a worthless item, resulting in legal battles and disappointment. If the signature is authentic, the collector who personally witnessed the signature has no written proof or guarantee to back up their claim of authenticity. Collectors who personally witnessed the signature on a collectible item want to provide proof their item is real, but currently have no way to do this. Once the personally witnessed collectible item is properly certified, the value of the item will increase because it will be recognized as authentic.

The present invention addresses this problem by providing convenient access to legally valid certificates of authenticity via the Internet to collectors who personally witness a signature on a collectible item. The present invention provides the collector with a certificate of authenticity containing a guarantee in writing by the collector, and a signature of the collector stating under penalty of perjury that the signature was personally witnessed by the collector and is therefore authentic. A person who is attempting to sell a forgery will not utilize the online system of the present invention due to the extreme penalty associated with the admission that they are committing a crime by signing the certificate of authenticity.

On the other hand, a person selling a collectible with an authentic, personally witnessed signature will now be able to obtain a legal certificate of authenticity that is valid across the entire United States. This certificate of authenticity will prove to prospective purchasers that the signature on the collectible item is real. Identical serialized holograms with bar codes on the certificate of authenticity and on a label that is to be affixed to the collectible item will ensure the collectible is traceable. Both the label and a high quality certificate of authenticity that is suitable for framing will be delivered to the collector.

All civil codes that govern certificates of authenticity across all 50 states will be adhered to, creating an industry wide, standardized certificate of authenticity document. In addition, every time a personally witnessed signed collectible item is sold, the new owner will have the opportunity to re-register the item over the internet and receive a valid certificate of ownership showing the history of the item and its chain of ownership.

SUMMARY OF THE INVENTION

The present invention is a method for providing on-line certificates of authenticity for collectibles to collectors who have personally witnessed a celebrity autographing the collectible. The collector uses his personal computer to access a website for the invention that is run on a central computer. The collector provides information on himself and the collectible to obtain a customer identification number for the collector and a serial number for the collectible.

The information is stored in the central computer. A certificate of authenticity bearing a serialized hologram with bar code that is unique for the collectible and a second identical serialized hologram with bar code for permanently attaching to the collectible are printed and delivered to the collector.

The collector must sign a statement on the certificate of authenticity that declares, under penalty of perjury, that the information he provided regarding the collectible is correct. The collector will then secure the duplicate serialized hologram with bar code to the collectible.

A subsequent user that may be the original collector, a prospective purchaser of the collectible, or a new owner of the collectible can access this information in the central computer by using his personal computer. The subsequent user can access the historical information regarding the collectible. For a user who is the new owner of the collectible, the user may re-register the collectible to reflect this change in ownership. This new information is added to the historical information previously stored on the central computer in association with the serial number for the collectible and is available for future access.

DETAILED DESCRIPTION OF THE PREFERRED EMBODIMENT INVENTION

Referring now to the drawings there is illustrated a method for providing on-line certificates of authenticity for collectibles according to a preferred embodiment of the present invention. Beginning with a FIG. 2A, the process will be described. The process begins at a start box, indicated in numeral 10 in FIG. 2A. The first thing that happens, as indicated in box 12, is the collector uses his personal computer 14 to access a website for the invention that is run on a central computer. As illustrated in box 16, when the collector connects to website, the collector must first complete a customer inquiry screen with customer information for the collector. As shown in box 18, once the customer information is provided, a customer identification number is assigned to the collector, and the collector then answers a series of questions related to the collectible item being certified.

Figure 2A:
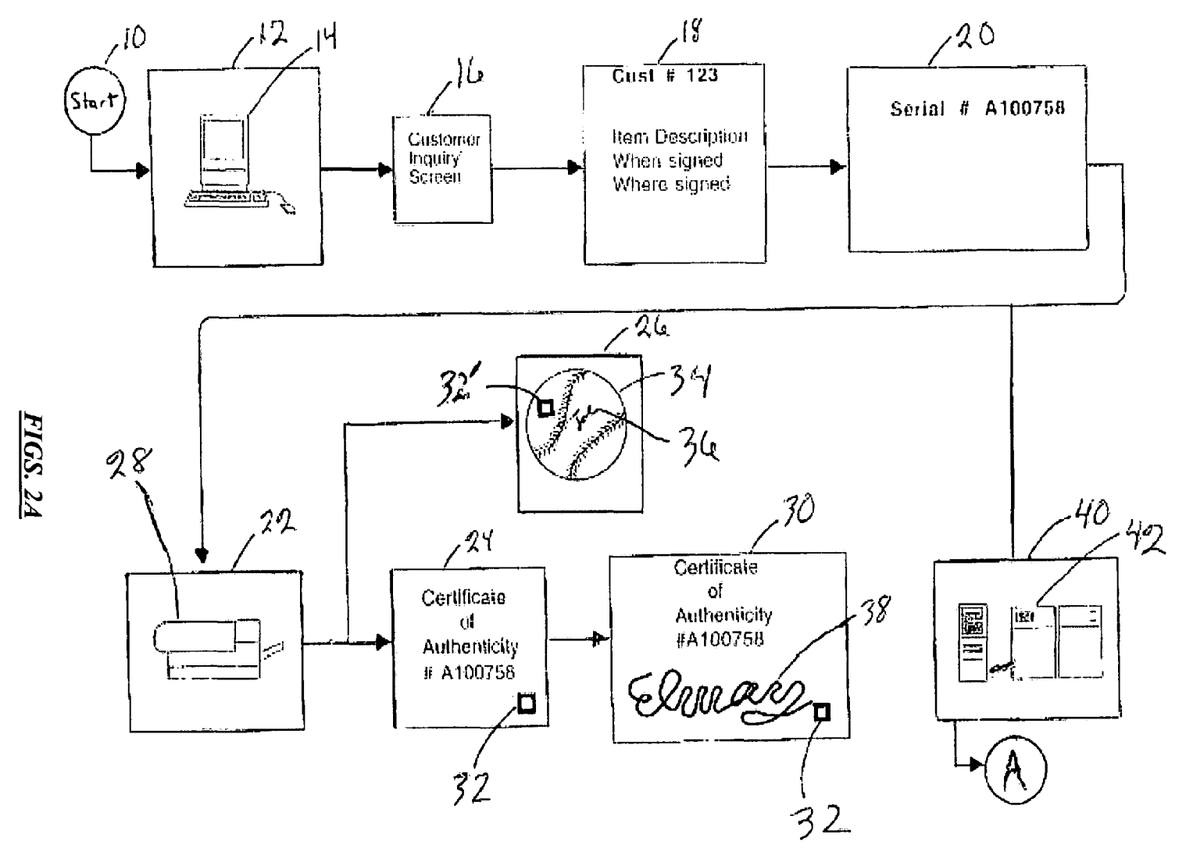
FIGS. 2A and 2B are a flow diagram of a method of providing on-line certificates of authenticity for collectibles according to a preferred embodiment of the present invention.

The information being requested in box 18 will satisfy current federal legal requirements and will include, but not be limited to, the following items of information:

1) description of the collectible item, 2) the name of the celebrity who autographed it, 3) the date and place the signature was autographed in the presence of the collector, 4) limited edition information such as the sequence number of the collectible and the total number in the limited edition, 5) the name of a witness to the autograph signing (if applicable), 6) an express warranty or guarantee the signature was personally witnessed, 7) the collector's true legal name and street address, 8) any identifying serial number on the collectible item, and 9) any additional information that may add to the legitimacy of the autograph such as the name of the trade show company that hired the celebrity, artist, or athlete.

Once the collector has provided the requested information, a serial number is assigned to the collectible, as indicated by box 20. As illustrated in boxes 22, 24 and 26, a printer 28 will next print two items: a certificate of authenticity 30 bearing a serialized hologram with bar code 32 that is unique for that collectible, and a second identical serialized hologram with bar code 32' for permanently attaching to the collectible or object 34. Both of these two items 30 and 32' will be provided to the collector via mail from the location of the printer 28.

Upon receiving these two items 30 and 32', the collector must sign his name 38 on a statement contained on the certificate of authenticity 30 that declares, under penalty of perjury, that the information he provided regarding the collectible 34 is correct. The collector will then secure the duplicate serialized hologram with bar code 32' to the collectible 34.

As shown in box 40, all of the information relating to the collector, the collectible 34, and the certificate of authenticity 30 will be stored in a central computer 42 for retrieval at a future time.

Figure 2B:
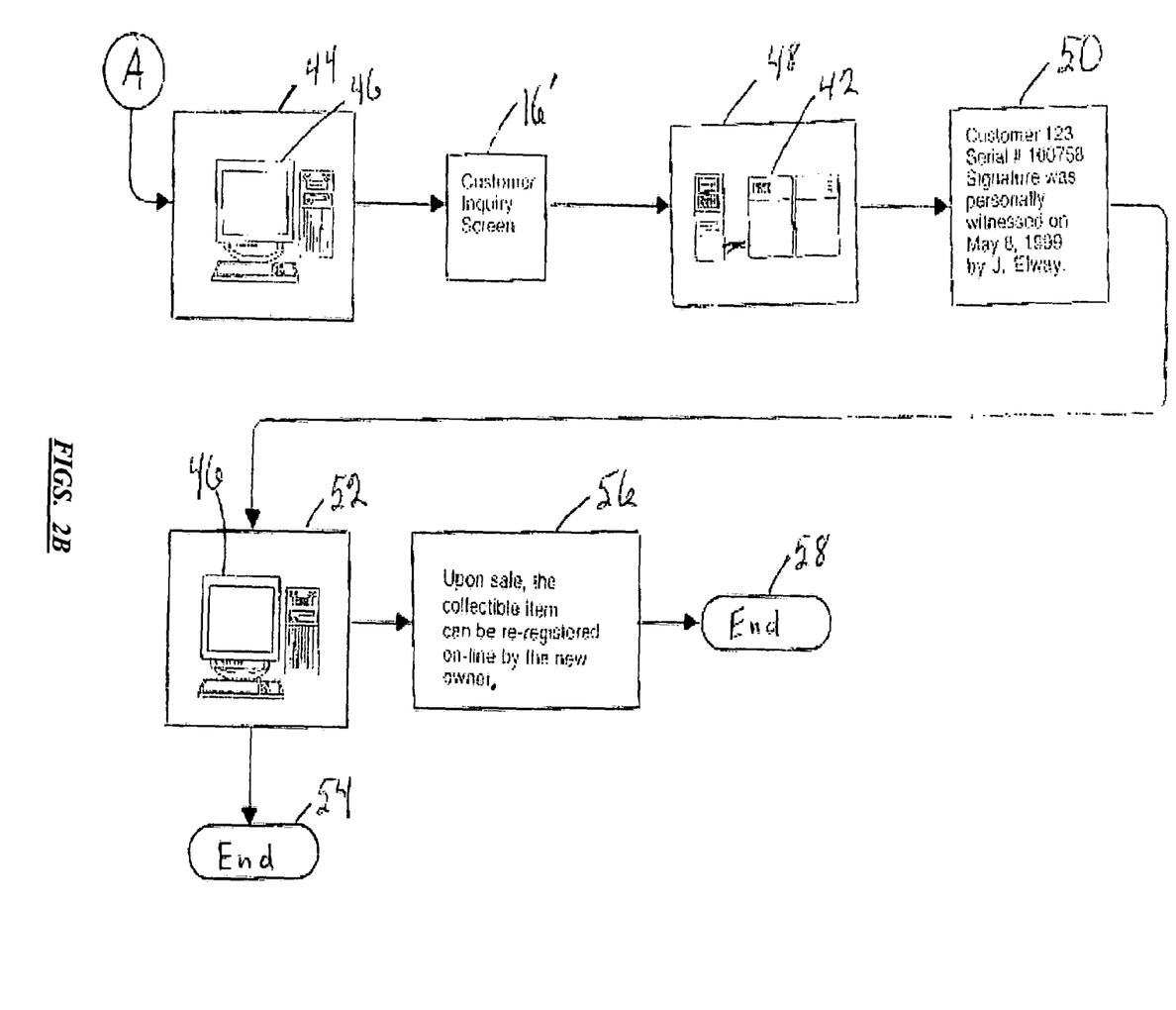

Referring now to FIG. 2B, as illustrated in box 44, a new user can access this information by using his personal computer 46 to connect to the same website on which the original collector registered the collectible. This new user may be the original collector, a prospective purchaser of the collectible 34, or a new owner of the collectible 34. The user then provides the information requested on the customer inquiry screen 16'. The information that was previously stored on the central computer 42 relating to the collectible 34 is then retrieved and displayed, as shown by boxes 48 and 50, respectively.

As illustrated in box 52, this information is displayed on the screen of the user's computer 46 and can be printed by the user. If the user is just seeking information on the collectible 34, then the process ends, as shown in box 54. As illustrated in box 56, if the user has purchased the collectible 34, the user may reregister the collectible 34 on-line by providing information on the new owner and their purchase of the collectible 34 similar to the way that the original collector registered the collectible 34. All of this new information is added to the historical information previously stored on the central computer 42 in association with the serial number for the collectible 34. This ends the process, as indicated by box 58, until a new user again accesses the information via the website to check on the authenticity of the collectible 34, to check on the history of the collectible 34, or to re-register the collectible that they have purchased.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed:

1. A method of verifying the authenticity of a signature on a collectible object comprising:

connecting to a central computer;

providing information about a signer;

transmitting an image of a suspected signature to said central computer;

selecting a type of collectible surface on which said suspected signature is inscribed;

comparing said image with a selected set of stored signatures at least one of said selected set signed at a different instance by said signer at said central computer to determine whether the suspected signature is authentic or not authentic; and communicating whether the signature is authentic or not authentic;

wherein said central computer has a number of different reference signatures stored in memory for each signer;

matching a set of reference signatures for said signer that most closely match said type of collectible surface; and storing submitted and generated information in said central computer for retrieval at a future time.

2. The method of claim 1 further comprising:

scanning the suspected signature.

3. A method of verifying the authenticity of a signature on a collectible object comprising:

connecting to a central computer;

providing information about a signer;

transmitting an image of a suspected signature to said central computer;

selecting a type of collectible surface on which said suspected signature is inscribed;

comparing said image with a selected set of stored signatures at least one of said selected set signed at a different instant by said signer at said central computer to determine whether the suspected signature is authentic or not authentic;

communicating whether the signature is authentic or not authentic; and matching said suspected signature to one or more reference signatures that are from similarly curved or spherical objects or irregularly shaped collectible objects.

4. The method of claim 1 further comprising:

for a signature determined to be authentic;

printing a certificate of authenticity bearing a serialized hologram;

printing a second identical hologram; and attaching the second hologram to the collectible.

5. The method of claim 4 further comprising:

storing information regarding said certificate of authenticity bearing a serialized hologram and said second identical serialized hologram in said central computer for retrieval at a future time.

6. A method of verifying the authenticity of a signature on a collectible object comprising:

connecting to a central computer;

providing information about a signer;

transmitting an image of a suspected signature to said central computer;

selecting a type of collectible surface on which said suspected signature is inscribed;

comparing said image with a selected set of stored signatures at least one of said selected set signed at a different instance by said signer at said central computer to determine whether the suspected signature is authentic or not authentic; and communicating whether the signature is authentic or not authentic;

wherein said suspected signature is compared with a set of authentic reference stored signatures selection of which is based on a user's input as to the type of collectible surface on which the suspected signature is inscribed and a user's input as to a signer of the object.

7. The method of claim 3 further comprising:

scanning the suspected signature.

8. The method of claim 3 further comprising:

for a signature determined to be authentic:

printing a certificate of authenticity bearing a serialized hologram;

printing a second identical hologram; and attaching the second hologram to the collectible.

9. The method of claim 3 further comprising:

storing information regarding said certificate of authenticity bearing a serialized hologram and said second identical serialized hologram in said central computer for retrieval at a future time.

10. The method of claim 6 further comprising:

scanning the suspected signature.

11. The method of claim 6 further comprising:

for a signature determined to be authentic:

printing a certificate of authenticity bearing a serialized hologram;

printing a second identical hologram; and attaching the second hologram to the collectible.

12. The method of claim 6 further comprising:

storing information regarding said certificate of authenticity bearing a serialized hologram and said second identical serialized hologram in said central computer for retrieval at a future time.

* * * * *